United States Patent
Wehrs et al.

(10) Patent No.: US 7,743,365 B2
(45) Date of Patent: Jun. 22, 2010

(54) DETERMINING AND USING CAPABILITIES OF A COMPUTER SYSTEM

(75) Inventors: Michael Edward Wehrs, Woodinville, WA (US); Richard Gains Russell, Sammamish, WA (US); Mark Lee Kenworthy, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 1126 days.

(21) Appl. No.: 11/112,323

(22) Filed: Apr. 22, 2005

(65) Prior Publication Data

US 2005/0209819 A1 Sep. 22, 2005

Related U.S. Application Data

(63) Continuation-in-part of application No. 10/609,187, filed on Jun. 26, 2003, now Pat. No. 7,231,322.

(51) Int. Cl.
*G06F 9/45* (2006.01)

(52) U.S. Cl. .................. 717/124; 717/120; 717/126; 717/131; 716/4; 716/5; 716/6

(58) Field of Classification Search ......... 717/124–135; 716/4–6
See application file for complete search history.

(56) References Cited

U.S. PATENT DOCUMENTS

| | | | | |
|---|---|---|---|---|
| 6,487,522 B1 * | 11/2002 | Smith et al. | ................. | 702/186 |
| 6,490,545 B1 * | 12/2002 | Peng | ........................... | 703/13 |
| 6,711,676 B1 * | 3/2004 | Zomaya et al. | ............. | 713/100 |
| 6,738,955 B2 * | 5/2004 | Andersen et al. | ................ | 716/4 |
| 6,782,421 B1 * | 8/2004 | Soles et al. | ................. | 709/223 |
| 6,792,392 B1 * | 9/2004 | Knight | ........................ | 702/186 |
| 6,952,767 B1 * | 10/2005 | Tanaka | ........................ | 713/100 |
| 6,961,794 B2 * | 11/2005 | Atherton et al. | ............. | 710/301 |
| 7,149,800 B2 * | 12/2006 | Koestler | ...................... | 709/224 |
| 7,366,685 B2 * | 4/2008 | Emerick et al. | ............... | 705/26 |
| 2003/0227477 A1 | 12/2003 | Kadiwala | | |
| 2004/0039561 A1 | 2/2004 | Montano et al. | | |

(Continued)

FOREIGN PATENT DOCUMENTS

EP     1 096 406     5/2001

(Continued)

OTHER PUBLICATIONS

Futuremark Corp., "Futuremark® service deployed for Windows XP game advisor," 2003, 2 pages [downloaded from the World Wide Web on Sep. 14, 2005].

(Continued)

*Primary Examiner*—Wei Y Zhen
*Assistant Examiner*—Matthew J Brophy
(74) *Attorney, Agent, or Firm*—Woodcock Washburn LLP (57) ABSTRACT

Techniques and tools for rating computer products, and communicating the rating between users, manufactures, vendors, and/or testing organizations, are described. A rating for hardware, software, clusters of computers, servers, and other computing products can be determined by comparing the system's attributes, capabilities, and features with rating requirements. A rating level is determined for the computer products based on a set of requirements and analysis of the products (e.g., by a computer running a rating tool). Once the computer product is rated, its "score" can be compared to other computing products to determine compatibility.

16 Claims, 5 Drawing Sheets

U.S. PATENT DOCUMENTS

2004/0268341 A1    12/2004    Kenworthy ................. 717/174

FOREIGN PATENT DOCUMENTS

GB          2 355 821         5/2001

OTHER PUBLICATIONS

Futuremark Corp., "Microsoft windows game advisor 3.0 launches," 2005, 2 pages [downloaded from the World Wide Web on Sep. 14, 2005].

Futuremark Corp., "Online servies: performance analyzer—FQA," 2005, 2 pages [downloaded from the World Wide Web on Sep. 14, 2005].

Futuremark Corp., "Online services: performance analyzer—performance analyzer service description," undated, 2 pages [downloaded from the World Wide Web on Sep. 14, 2005].

Futuremark Corp., "Online services: performance analyzer," undated, 2 pages [downloaded from the World Wide Web on Sep. 14, 2005].

International organization for Standardization, "Stages of the development of international standards," 2003, 3 pages [downloaded from the World Wide Web on May 25, 2003].

International Organization for Standardization, "How are ISO standards developed?" 2002, 2 pages [downloaded from the World Wide Web on May 25, 2003].

MacSpeedZone, "MacBench 4.0 documentation," 1999-2003, 25 pages, [downloaded from the World Wide Web on May 29, 2003].

Mäkinen, et al., "A detailed process assessment for software SMEs," *EuroSPI 2000*, 2000, 11 pages [downloaded from the World Wide Web on May 25, 2003].

Microsoft Corporation, "Multimedia PC level 1 and level 2 specifications," *Microsoft Knowledge Base Article 106055*, 1999, 5 pages, [downloaded from the World Wide Web on May 25, 2003].

Microsoft Corporation, "Software 'Designed for Windows XP,'" 2002, 1 page, [downloaded from the World Wide Web on May 26, 2003].

Microsoft Corporation, "Software technical requirements," 2002, 1 page [downloaded from the World Wide Web on May 26, 2003].

Microsoft Corporation, "Windows logo program: 'Designed for Windows XP' application specification, Version 2.3," 2002, 1-10.

Microsoft Corp., "Windows game advisor," 2005, 3 pages [downloaded from the World Wide Web on Sep. 14, 2005].

Monroe, "How to buy software for Windows 95/98," 1998-1999, 3 pages.

PC Certify, Inc., "InfoSpotter SnapShot (System Discovery Engine)," 1999-2003, 5 pages [downloaded from the World Wide Web on May 23, 2003].

PC Certify Inc., "PC certify testing log," www.pccertify.com/downloads/pdf/samlpe_Burn-in-log.pdf, 2000, 11 pages [downloaded from the World Wide Web on May 25, 2003].

Senftleben, "The notebook/2site," 1998, 2 pages [downloaded from the World Wide Web on May 23, 2003].

Senftleben, "The notebook/2 site: How to use this site to make a buying decision," 1998, 2 pages [downloaded from the World Wide Web on May 25, 2003].

SiSoftware, Ltd., "SiSoftware Sandra legacy re-released," 2004, 2 pages [downloaded from the World Wide Web on Jun. 24, 2005].

Smith, N., "3DMark2001," undated, 2 pages [downloaded from the World Wide Web on Sep. 14, 2005].

Zwlwietro, "Technology: MPC standards," 1996, 3 pages [downloaded from the World Wide Web on Sep. 14, 2005].

* cited by examiner

DETERMINING AND USING CAPABILITIES OF A COMPUTER SYSTEM

REFERENCE TO CO-PENDING APPLICATIONS

This is a continuation-in-part application and claims priority to U.S. application Ser. No. 10/609,187 filed Jun. 26, 2003, entitled "Hardware/Software Capability Rating System," which is incorporated herein by reference in its entirety.

FIELD OF THE INVENTION

The present invention relates generally to determining the capability of computing products, and more particularly, to creating a system to easily match the capabilities of computing products and software applications to determine that the two will work well together from a base compatibility to feature performance meeting a users expectations.

BACKGROUND OF THE INVENTION

Matching system requirements of software with the specifications of the computer system on which it will be used is essential to ensure proper functioning of the software on the system. This is especially true for applications that place significant demands on the computer system, such as computer games and computer-assisted drafting tools. Purchasing software for use on a computer system currently requires an understanding of the system requirements of the software and technical details of the computer system. Unfortunately, the average consumer is often unable to match software requirements to system specifications due to the level of technical knowledge required. Furthermore, users of resource-intensive applications upgrade their PCs more frequently than those who do not. Therefore, the ability of consumers to match software requirements with system specifications is important to not only the consumers, but also to the PC manufacturers, component manufacturers, software manufacturers, and hardware and software retailers.

To date, application software, middleware, and operating systems have, at best, relied on a limited inventory of awareness of the components in a computer system when they are installed. This has led to a general case installation based on assumptions of the actual capabilities of the subsystems in the computer. For example, being aware of how much RAM (random access memory) or how large a hard drive is does not allow software to optimize its buffer transfer sizes because there is no metric associated with that inventory of memory or disk size. Not having that relevant information places a burden on the user or purchaser. The only way to ensure a given application will run well on a given computer or computing product is to compare the detailed technical specifications. This requires a high level of knowledge and sophistication on the part of the purchaser.

The entertainment software market provides an example of the effects of software requirements/system specifications matching problems facing PC hardware and software manufacturers today. Games created for console platforms (e.g., Sony Playstation® 2, Nintendo® GameCube, or Microsoft® Xbox) tend to have more consistent sales volumes than games created for general-purpose personal computers in part because, with a better guarantee of matching software requirements with system specifications, customers are more willing to buy console titles. Keeping the PC ecosystem vibrant for both games and other performance demanding applications requires a system that enables consumers to purchase such applications with the same surety provided by the game console platforms.

Previous attempts to categorize computer systems were based only on a list of required components for a system. In the 1990s, the Multimedia PC Marketing Council introduced the Multimedia PC (MPC) specifications to provide PC specification guidelines for consumers wishing to run multimedia applications. For example, to achieve the Level 1 MPC specification, a computer system was required to have a processor, RAM, hard disk drive, CD-ROM drive, sound card, and video display with certain characteristics.

Previous attempts to categorize software include Microsoft's "Designed for Windows 95" logo program. Software vendors were granted permission to use Microsoft's "Designed for Windows 95" logo if the vendors met certain software design requirements set by Microsoft. The design requirements ensured that software carrying the logo would work effectively and reliably in a Microsoft Windows 95 operating system environment.

Whatever the benefits of previous techniques, however, they do not have the advantages of the techniques and tools presented below.

SUMMARY OF THE INVENTION

The following summary provides an overview of various aspects of the invention. It is not intended to provide an exhaustive description of all of the important aspects of the invention, nor to define the scope of the invention. Rather, this summary is intended to serve as an introduction to the detailed description and figures that follow.

In summary, the described techniques and tools facilitate assigning ratings to computer products based on an analysis of the attributes, capabilities, and features of the computer hardware and the requirements of computer software.

An embodiment of the present invention is directed to a method for determining a capability level of a computer product. A request is received from an entity for evaluation of the computer product, an analysis is performed on the computer product, and a capability indicator level is assigned to the computer product based on the analysis. The computer product may be computer hardware, software, servers, or a cluster of computing devices, for example. Moreover, the entity may be a manufacturer, a vendor, or a user.

According to aspects of the invention, the analysis is performed by at least one of a manufacturer, a vendor, a user, and a testing organization. The analysis comprises, for example, determining at least one of attributes, capabilities, and features of the computer hardware and comparing that to a set of predetermined criteria. The analysis may additionally or alternatively comprise determining which ones of attributes, capabilities, and features of computer hardware will run the computer software at a predetermined performance level.

Another embodiment of the invention is directed to a method for determining the compatibility and achieving a predictable performance level that users will expect between a software application and a computing device on which the software application is to be run. Such an exemplary method comprises determining a capability indicator level of the software application, determining the capability indicator level of the computing device, and comparing the capability indicator level of the software application against the capability indicator level of the computing device.

According to aspects of the invention, the capability indicator level of the software application is determined by a hardware and/or software manufacturer, a hardware and/or software vendor, a user, or a testing organization. An indication of the compatibility between the software application and the computing device may be provided based on a comparison of the capability indicator level of the software application and the capability indicator level of the computing device.

A further embodiment in accordance with the present invention is directed to a method for providing a user with the ability to determine a rating level of a product, comprising providing a listing of potential capability rating levels of the product to the user, and providing rating analysis instructions to the user. The rating analysis instructions may comprise techniques for analyzing at least one of attributes, capabilities, and features of the product, wherein the product comprises computer hardware, and/or comprise techniques for analyzing computer software, and/or comprise techniques for analyzing servers or clusters of computing devices.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF THE PREFERRED EMBODIMENTS

Overview

Techniques and tools for implementing a rating system, and communicating ratings between users, manufacturers, vendors, and/or testing organizations, are described. The techniques and tools expedite the process of matching software requirements with computer system specifications. The techniques and tools provide a rating system that allows prospective purchasers (and sellers) of all knowledge levels to confidently purchase (and sell) computing products including software for a PC, and to understand the value they would receive from purchasing new PC components or a new PC capable of running a broader set of applications.

Consumers, hardware vendors, and software vendors can benefit from techniques and tools that allow a person with a limited understanding of computer system capabilities and software requirements to make informed software and hardware purchases. The described techniques and tools help consumers by, for example, allowing them to purchase demanding multimedia software applications (e.g., games, CAD programs, photo-editing programs, feature-rich operating systems, etc.) without having an unsatisfactory experience due to substandard performance on their PC.

Consumers can use a rating on a piece of software or hardware to determine if their computer system is becoming substandard for the applications they wish to use. Further, consumers then can use the rating information to make an accurate determination of what capability level to seek in a new system purchase or system upgrade. For example, computer games often require a high level of computer performance. Computer game players can use the rating information to determine the best computer system or component for a game they wish to play, or to find a computer game well-suited to the capabilities of their current system.

In some embodiments, the rating tool is part of the operating system. For example, an operating system running on a PC includes a rating tool which facilitates determining a rating for the PC, a piece of software, or other computing product. The rating tool also can update ratings for the PC or PC components when the PC is upgraded, or when new rating level requirements are determined. The trigger to initiate a new rating can include when (1) a new piece of software is downloaded/loaded onto the computing system, (2) if the operating system detects a new piece of hardware or software, and (3) when the user requests for a new rating to be performed. The rating number can be viewed by the user through an interface or tool in the control panel of the operating system, for example. The tool, in some embodiments, can also be used to rate a cluster of computers. Additionally, in some embodiments, the rating tool can be used for rating a server and components of a server.

Rating systems can be used for different types of applications. For example, a low rating on a sound card might reduce a rating for games, but may not reduce a rating for running CAD applications, where sound is less important to application performance.

The described techniques and tools help OEMs (original equipment manufacturers) by, for example, instilling in consumers increased confidence in the quality of purchased PCs, and increasing motivation to purchase new PCs through consumer desires for key entertainment and other applications. Consumers may purchase higher-end PCs (which typically have higher profit margins than lower-end systems) because of a desire for and increased ability to recognize the value of more highly capable systems. Further, since the rating system clarifies software compatibility, the burden placed on customer support resources by frustrated customers is reduced.

Similarly, the described techniques and tools help independent hardware vendors by, for example, encouraging consumers to purchase more high-end components as part of new higher-end PC sales or through PC component upgrades. Furthermore, the described techniques and tools help software manufacturers through, for example, increased consumer purchasing confidence, increased sales of software that typically comes bundled with new PC purchases (e.g., operating systems, personal productivity software, and utilities), and, similar to OEMs, by reducing the burden on customer support resources.

Rating tools facilitate assigning ratings to computer products. For example, in some embodiments, a computer user can use a rating tool to determine a rating level for a computer system. In other embodiments, a computer hardware vendor, such as a PC manufacturer or PC component manufacturer, can use a rating tool to determine rating levels for its products. There are several differences between rating tools and benchmarking applications; these differences are made apparent from the descriptions and examples herein.

In some embodiments, a standardized rating presentation is used to associate computer hardware or software with ratings. For example, a rating presentation indicating the rating (e.g., an integer number) for a product is used by hardware manufacturers under a licensing agreement. Standard presentations can include several rating levels. For example, the software presentation can include a minimum rating level, a recommended rating level, and/or a "best experience" rating level.

Exemplary Computing Environment

Figure 1:
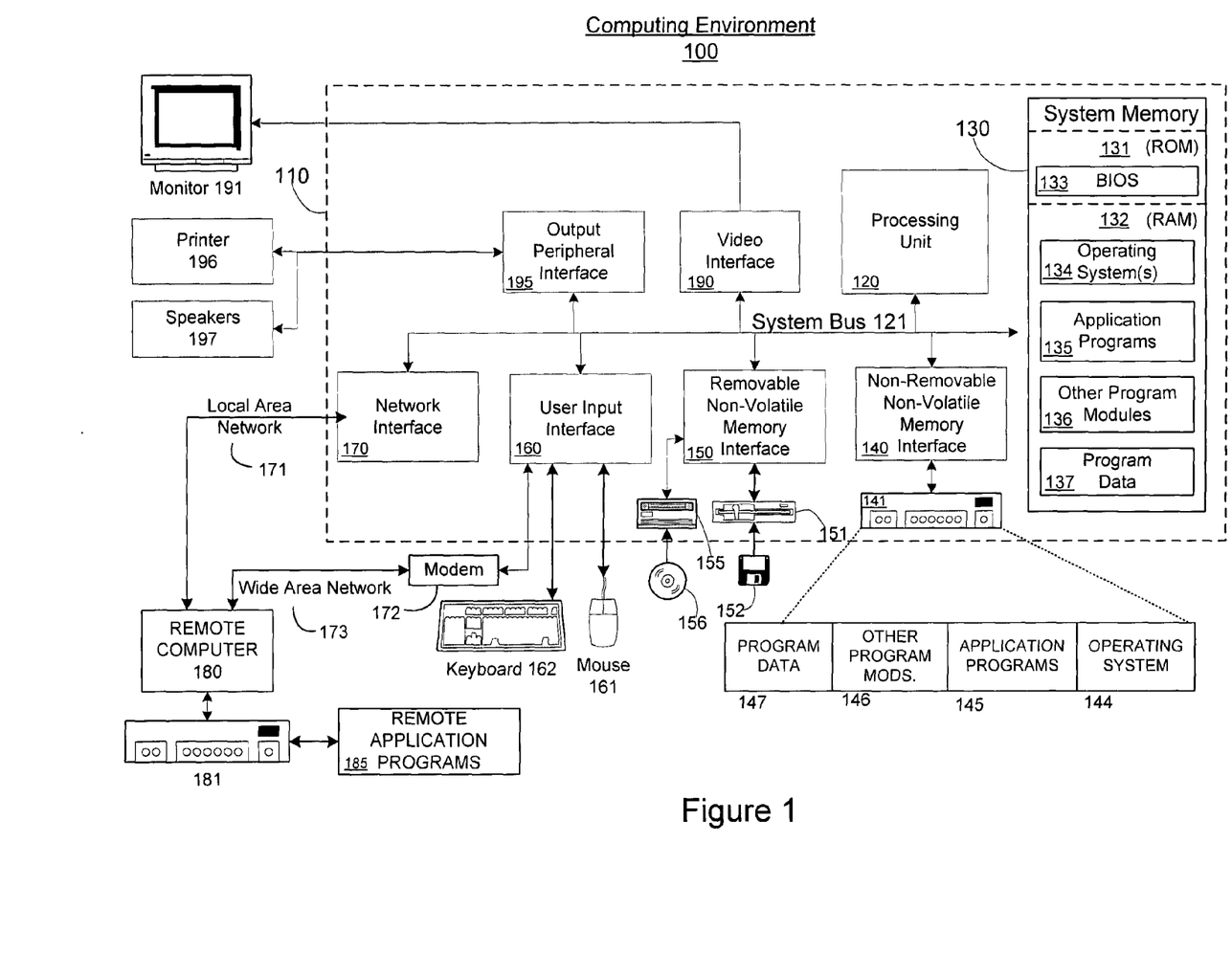
FIG. 1 is a block diagram showing an exemplary computing environment in which aspects of the invention may be implemented.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface (wired or wireless) or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Exemplary Embodiments

The described techniques and tools allow hardware and software vendors, manufacturers, testing organizations, and users to communicate, in a simple and easily understood manner, ratings for computer hardware and software. For example, the software developer and the manufacturer or assembler of PC systems will each be able to note on their products' packaging what rating indicator they require or support. The rating tool will help promote consumer confidence leading to an increase in purchases of computer related hardware and software and greater satisfaction when using those items as the performance will match a user's expectations.

A rating level represents the capability of the rated item to perform functions for which the rated item is designed. For example, the rating of a computer system represents the capability of the computer system to run software applications. The rating of a cluster of computers, for example, represents the capability of the cluster to parallel process, load balance, etc. The rating of a server, for example, represents the capability of the server to manage or provide services to a network, etc.

The rating of a computer system is typically a function of the ratings of its components. However, it may not be necessary to increase ratings for all components of a system in order to increase the rating for the system as a whole. In some embodiments, a rating level is determined (e.g., by a rating tool) using a "weakest link" analysis—the rating level for a system is determined by identifying the component within the system having the lowest capability. For example, the rating level for a computer system is determined to be "3" by finding that the component within the primary device set of the system with the lowest capability has a rating level of "3." The "weakest link" analysis also can be applied to determining ratings for PC components by determining the feature of the component with the lowest capability.

The rating of a computer system, for example, may also be a function of the combined analysis of the attributes, capabilities, and features of a computing product. An attribute is an inherent system characteristic or degree to which a system will adhere to a standard. Attributes often contribute directly to the ability of a system to effectively run particular software or class of software. The attributes often also play a big role in system purchasing and configuration decisions. Performance is a commonly measured and expressed attribute. For example, an attribute may be expressed in terms of a unit of measure (inches, bytes per second, a measured frequency, megabytes, etc.).

A feature, in contrast to an attribute, is a prominent or distinctive part, component, or characteristic. Features are not measured; they are detected or enumerated. Example of features include USB 2.0, a memory size of at least 512 MB, a DVD drive, etc.

A capability is a system's ability to effectively perform a specified function or task or class of functions or tasks. Capabilities are often present or absent but can also be present to some matter of degree, measure, or metric. To be present, a capability requires, for example, a specified or minimum level of one or more attributes, the presence of one or more of the specified features, or a directly measured, a detected ability or an expression of a specific function or task or class of functions or tasks.

Figure 2:
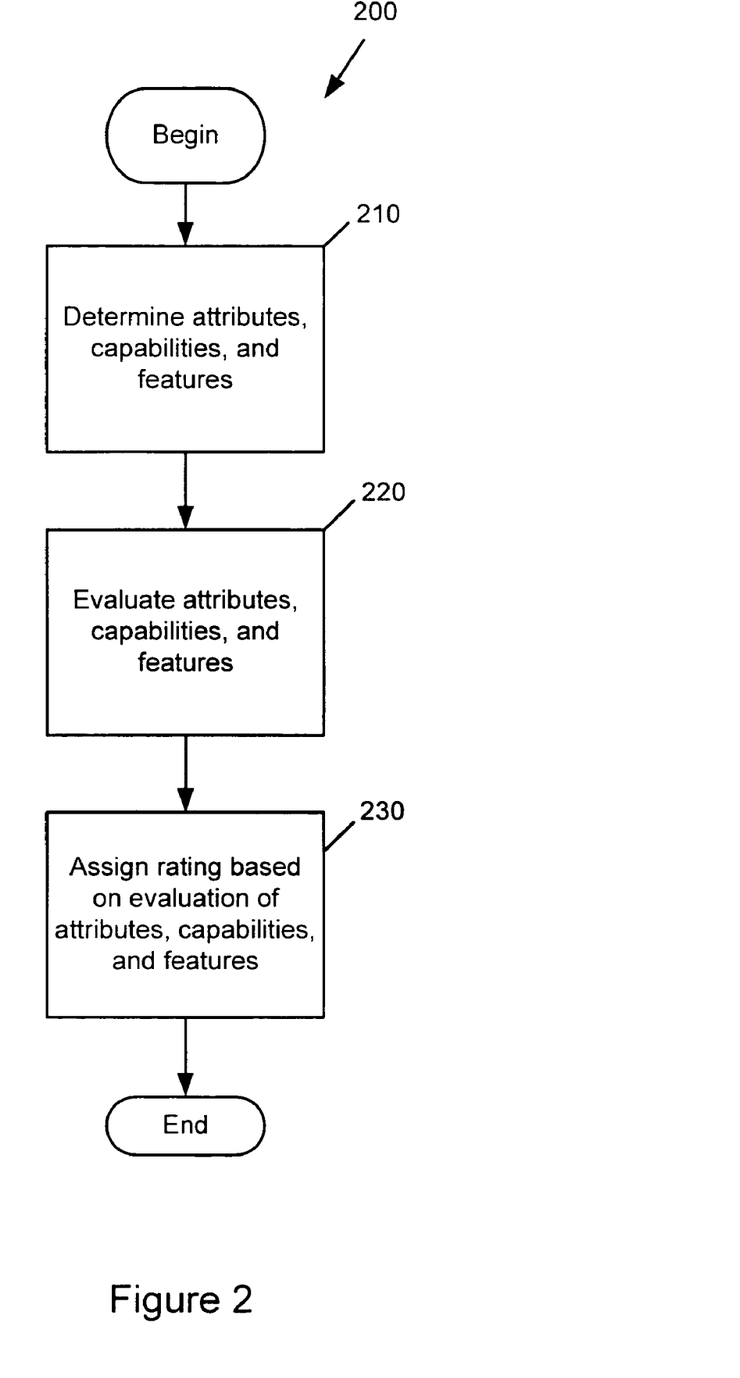
FIG. 2 is a flowchart showing an exemplary technique for assigning a rating to a computing device in accordance with the present invention.

FIG. 2 shows a technique 200 for determining a rating for a computer system or component. At step 210, an inquiry is performed to determine the attributes, capabilities, and features of a computer system or component. For example, when determining a rating for a computer system, the rating tool takes an inventory of the attributes, capabilities, and features of the system to run software applications. This inventory can include a testing of the capabilities of particular components of the computer system.

At step 220, attributes, capabilities, and features of the computer system or component are evaluated to determine a rating. A rating is determined based on the level of the attributes, capabilities, and features of the computer system. For example, a rating for a graphics component may require graphics component to have a graphics chip capable of transforming 1,000,000 generic polygons per second and require a certain level of overall graphics performance for the component. A graphics component may not qualify for the rating if it has a graphics chip capable of transforming the required number of generic polygons per second but the chip is not able to transform that many polygons with a specific set of features turned on.

At step 230, a rating is assigned to the system or individual component based on the inquiry and evaluation of the attributes, capabilities, and features when compared against predetermined criteria.

Rating tools are tools for assigning rating levels to computer products. For example, in some embodiments, a computer user can run a rating tool on a PC to determine a rating level for the system. In other embodiments, an OEM, a vendor, or testing lab can use a rating tool to determine rating levels. Rating tools for OEMs, vendors, and testing labs can include a more extensive set of testing tools, while rating tools for most consumers can include fewer testing tools and run more quickly than rating tools for OEMs, vendors, and testing labs. However, rating tools for consumers wishing to perform more robust testing of computer systems can include a full set of testing tools.

Rating tools can analyze computer product attributes, capabilities, and features and use the results of the analysis in combination with rating level data to determine a rating level (e.g., an integer number) for the hardware, software, servers, etc. Rating level data can be accessed from a database (e.g., an online database), for example, or can be provided with a computer system (i.e., as a tool of the operating system) or component (e.g., embedded in a device driver signature). Additionally, a rating tool can be accessed or downloaded over a network (LAN or WAN), accessed locally (e.g., as a feature of an operating system on a computer system to be rated), or provided to a user of the tool by other means (e.g., by distribution on a CD-ROM or other computer-readable medium).

Figure 3:
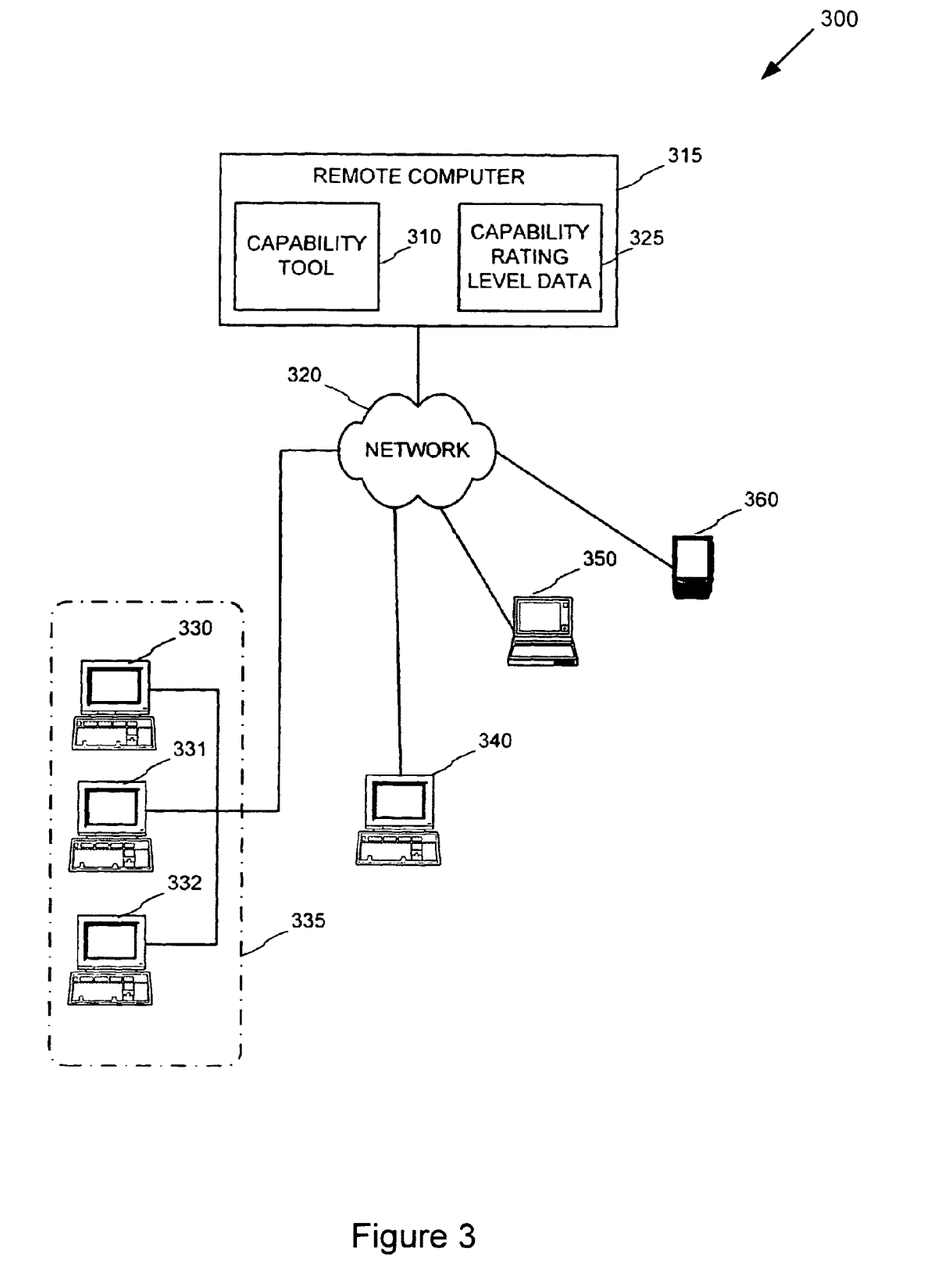
FIG. 3 is an illustration of an exemplary arrangement by which a user can access a rating tool via a network in accordance with the present invention.

FIG. 3 shows an exemplary arrangement 300 in which one or more computer users can access a rating tool 310 at a remote computer 315 via a network 320. In addition to the rating tool 310, the remote computer 315 also can have rating level data 325, for example in a database, which the rating tool can use to determine ratings for a computer product. Alternatively, rating level data can be located at another location (e.g., within the rating tool itself, or in a device driver signature of a hardware component). A computer user can use the rating tool 310 by connecting to remote computer 315 and running the tool from the remote computer (e.g., via a web interface). Or, a computer user can download the rating tool 310 and run the tool locally.

In some embodiments, a rating tool is available at a website of a computer hardware or software manufacturer for use by users or retailers of the manufacturers' products. In particular, an online rating tool can be useful for retailers providing PC upgrade services. For example, a computer vendor can have a link on their website to display examples of software titles that run well on a particular computing device (e.g., a computing device with a rating level of 3 will show the top 50 software titles that can be run on the level 3 computing device). The computer vendor can also have a second link showing the consumer what software titles can run on a level 4 computing device, effectively marketing a higher end machine. In other embodiments, the vendor can have a link for "what do I need to do to improve my rating of my PC" in which a user can see what items from a shopping list they can added to increase their rating. In other embodiments, a rating tool is available on another website for use by a manufacturer of computing products.

A computer user can access the rating tool 310 from a variety of computing devices connected to network 320 via a wired connection (e.g., via an analog telephone line connection, DSL connection, cable modem connection, or some other wired connection) or a wireless connection, and/or via some other network. For example, a computer user can access rating tool 310 via a desktop computer connected to a local network, such as desktop computers 330-332 connected to local network 335 or a computer user can access rating tool 310 via a desktop computer that is not connected to a local network, such as desktop computer 340. A computer user can also access the rating tool 310 from computing devices such as portable laptop computer 350, hand-held computer 360, or some other computing device, such as a computing device with cellular telephone functionality or other functionality.

Rating tools can provide information to a user of the tool regarding the system or component being rated. For example, in some embodiments, in addition to providing a rating, a rating tool for determining a rating for PC can display (e.g., via a graphical user interface) capability level requirements for one or more capability levels, ratings for components of the PC, and/or a comparison of the PCs features and performance with those needed to reach one or more capability levels (e.g., showing how PC specifications exceed or fall short of requirements for a given capability level). Rating tools for consumers can differ from rating tools for vendors in terms of the amount and nature of information they display. Rating tools for vendors, for example, may contain additional technical details regarding component and feature inventories and performance results. For example, a rating tool for use by a component manufacturer may include technical performance data and details on how to improve a component's rating.

Rating tools can use tools such as Microsoft's DirectX Diagnostics (DXDiag), DirectX Caps Viewer, or Display Conformance Test (DCT) or benchmarking tools to perform or assist in performing certain functions, such as taking inventory of components or component features, or testing performance of systems or components.

Figure 4:
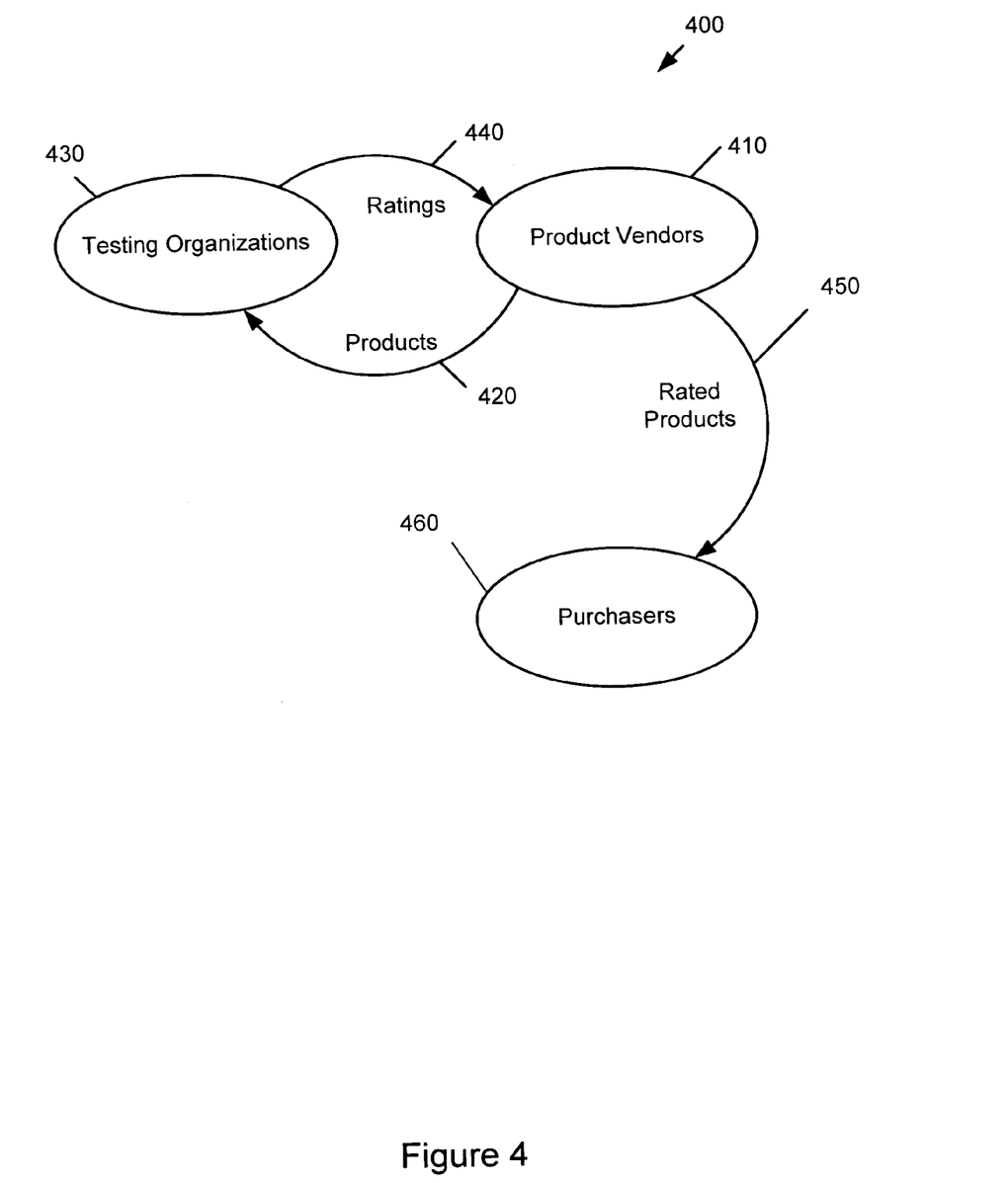
FIG. 4 is an illustration of an exemplary arrangement for rating of computer products by testing organizations in accordance with the present invention.

Testing organizations can use rating level requirements to test computer hardware or software and assign appropriate ratings to the hardware or software. For example, FIG. 4 shows an exemplary arrangement 400 for rating computer products by testing organizations. Product vendors 410 provide products 420 to testing organizations 430. The testing organizations test the products and use the rating level requirements to provide ratings 440 for the products 420. The product vendors 410 can then sell rated products 450 to purchasers 460.

Figure 5:
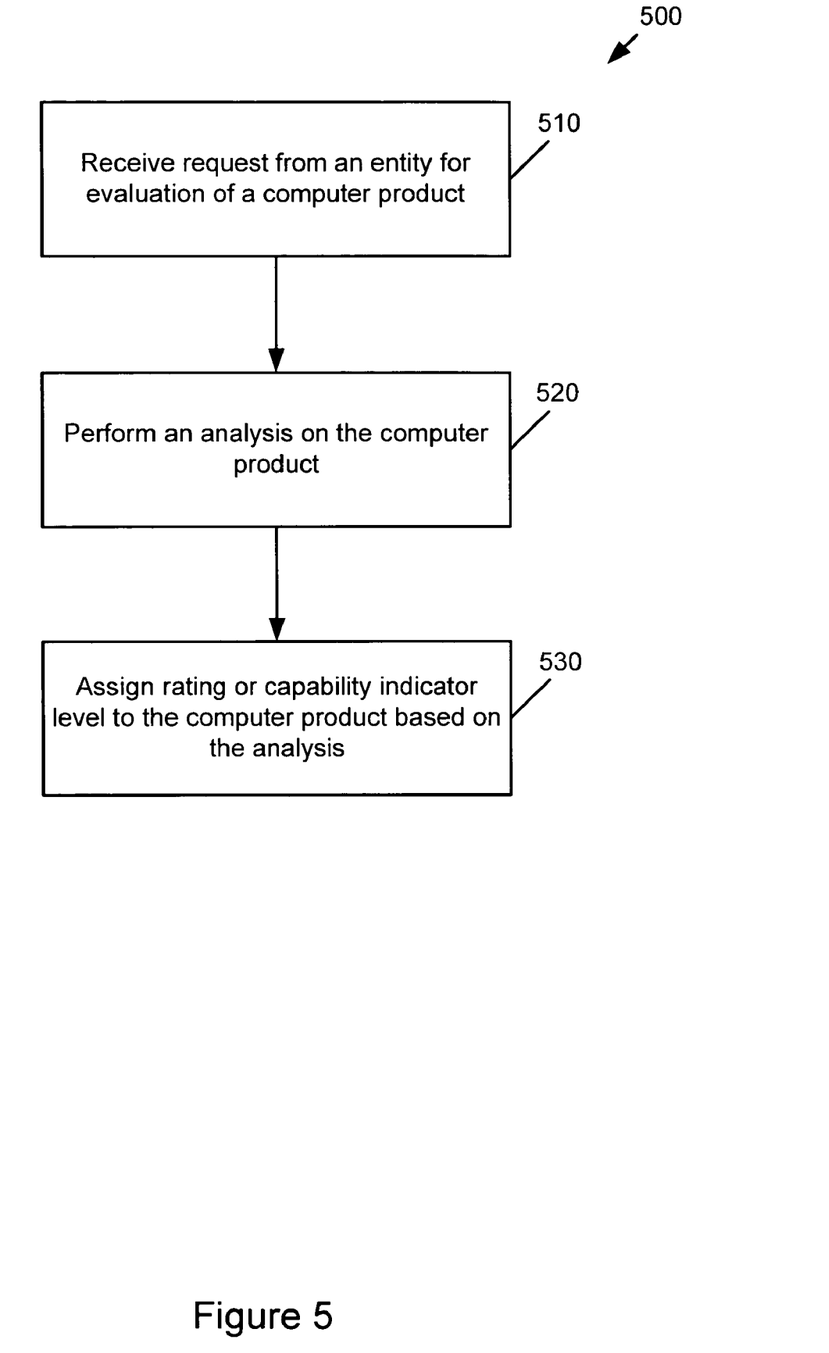
FIG. 5 is a flowchart of an example method for determining a capability level of a computer product in accordance with the present invention.

FIG. 5 is a flowchart of an example method 500 for determining a capability level of a computer product in accordance with the present invention. At step 510, a request is received from an entity for evaluation of a computer product. The entity making the request may be a computer hardware or software manufacturer, vendor, or user, for example. The computer product may be hardware, software, a server, or a cluster of computing devices for example.

At step 520, an analysis is performed on the computer product. The analysis may be performed, locally or remotely, by the recipient of the request. For example, the analysis may be performed on-site at the entity's location or may be performed remotely, e.g., by a testing organization.

After the analysis is performed, a rating or capability indicator level is assigned to the computer product, at step 530, based on the analysis. If the computer product is computer hardware, then the analysis comprises, for example, determining attributes, capabilities, and/or features of the computer hardware and comparing them against predetermined criteria. If the computer product is software, then the analysis comprises, for example, determining which attributes, capabilities, and/or features of computer hardware will run the computer software at a predetermined performance level.

To associate hardware with ratings that are assigned to them, a standardized rating presentation can be placed on computer hardware. In some embodiments, a rating presentation indicating the rating (e.g., an integer number) for a product is used by OEMs, hardware and/or software vendors, channel partners, Enterprise, SMORG, and individual end users under a licensing agreement (e.g., an agreement with an entity that has set rating level requirements and implemented the presentation of rating levels in a standardized format). The licensing agreement can require, for example, that the component or system must have been tested by an approved testing organization to verify the rating level. The standardized rating presentation allows consumers to use ratings when determining which computer system or component to purchase, based on their desire to run applications that require or recommend certain capability levels.

Software vendors can use a standardized rating presentation for software for their products. In some embodiments, the standardized rating presentation for software is virtually identical to the hardware presentation to help consumers recognize and match ratings for hardware and software. The standardized rating presentation for software may also be used under a license agreement. Such an agreement may further require, for example, that software products using the rating presentation conform to other standards. For example, the license agreement may require the software to fulfill requirements for running the software on a particular operating system (e.g., Microsoft's Windows XP application logo requirements).

The software presentation can include several rating levels. For example, the software presentation can include a minimum rating level, a recommended rating level, and/or a "best experience" rating level. Having several rating levels in the presentation allows consumers with different expectations of performance to select software that works best for them. Furthermore, having rating levels such as a "best experience" rating level can encourage consumers to purchase system upgrades.

As mentioned above, while exemplary embodiments of the present invention have been described in connection with various computing devices, the underlying concepts may be applied to any computing device or system.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiments for performing the same function of the present invention without deviating therefrom. Therefore, the present invention should not be limited to any single embodiment, but rather should be construed in breadth and scope in accordance with the appended claims.

What is claimed is:

1. A method for determining a capability indicator level of a computer product, the method comprising: receiving, in a computer system, a request from an entity for evaluation of the computer product; using the computer system to perform an analysis on the computer product, wherein the analysis comprises determining an inventory of a plurality of hardware components of the computer product and assigning a respective rating level to each hardware component of the plurality of hardware components of the computer product; and assigning a capability indicator level to the computer product by the computer system based on said analysis and based on a type of application to which the capability indicator level is applicable, wherein the type of application is one of a plurality of different types of applications, each type of application associated with a respective rating system that considers a respective subset of the plurality of hardware components of the computer product, wherein assigning the capability indicator level comprises identifying the hardware component having a lowest rating level of the respective subset of the plurality of hardware components considered by the respective rating system associated with the type of application to which the capability indicator level is applicable having a lowest rating level.

2. The method of claim 1, wherein the entity comprises one of a computer hardware manufacturer, a vendor, and a user.

3. The method of claim 1, wherein the analysis is performed by at least one of a computer hardware manufacturer, a vendor, a user, and a testing organization.

4. The method of claim 1, wherein performing the analysis comprises determining at least one of attributes, capabilities, and features of the hardware components and comparing the at least one of the attributes, capabilities, and features against predetermined criteria.

5. The method of claim 1, wherein the computer product comprises computer software.

6. The method of claim 5, wherein the entity comprises one of a computer software manufacturer, a vendor, and a user.

7. The method of claim 5, wherein the analysis is performed by at least one of a computer software manufacturer, a vendor, a user, and a testing organization.

8. The method of claim 5, wherein performing the analysis comprises determining which ones of attributes, capabilities, and features of computer hardware will run the computer software at a predetermined performance level.

9. The method of claim 1, wherein the computer product comprises servers or a cluster of computing devices.

10. A method for determining the compatibility between a software application and a computing device on which the software application is to be run, the method comprising: using the computing device to determine a plurality of capability indicator levels of the software application, wherein the plurality of capability indicator levels comprises a minimum capability indicator level, a recommended capability indicator level, and a best experience capability indicator level; using the computing device to determine a capability indicator level of the computing device at least in part by determining respective rating levels of a plurality of hardware components of the computing device and identifying a hardware component of a subset of the plurality of hardware components that has a lowest rating level, wherein the respective rating levels used in determining the capability indicator level of the computing device are determined as a function of a type of the software application, wherein the type of the software application is one of a plurality of different types of software applications, each type of software application associated with a respective rating system, and wherein the hardware components comprising the subset of the plurality of hardware components of the computer product are determined by the respective rating system that is associated with the type of the software application; and using the computing device to compare at least one capability indicator level of the plurality of capability indicator levels of the software application against the capability indicator level of the computing device.

11. The method of claim 10, wherein the capability indicator level of the software application is determined by a software manufacturer, a software vendor, a user, or a testing organization.

12. The method of claim 10, wherein the capability indicator level of the computing device is determined by a hardware manufacturer, a hardware vendor, a user, or a testing organization.

13. The method of claim 10, wherein the comparing is performed by at least one of a software manufacturer, a hardware manufacturer, a vendor, a user, and a testing organization.

14. The method of claim 10, further comprising providing an indication of the compatibility between the software application and the computing device based on the comparison of the capability indicator level of the software application and the capability indicator level of the computing device.

15. The method of claim 10, wherein the computing device comprises servers or a cluster of computing devices.

16. A computer system for determining a capability indicator level of a computer product comprising:

a processor; and a memory having stored therein instructions comprising:

receiving, in the computer system, a request from an entity for evaluation of the computer product;

using the computer system to perform an analysis an the computer product, wherein the analysis comprises determining an inventory of a plurality of hardware components of the computer product and assigning a respective rating level to each hardware component of the plurality of hardware components of the computer product; and assigning a capability indicator level to the computer product by the computer system based an said analysis and based an a type of application to which the capability indicator level is applicable, wherein the type of application is one of a plurality of different types of applications, each type of application associated with a respective rating system that considers a respective subset of the plurality of hardware components of the computer product, wherein assigning the capability indicator level comprises identifying the hardware component having a lowest rating level of the respective subset of the plurality of hardware components considered by the respective rating system associated with the type of application to which the capability indicator level is applicable.

* * * * *